June 30, 1970 R. H. ENGELMANN 3,518,443
SYSTEM FOR DETECTING SMALL LIGHT SOURCES IN PRESENCE
OF LARGE ONES USING PLURALITY OF DETECTORS
Filed Dec. 7, 1966 4 Sheets-Sheet 1
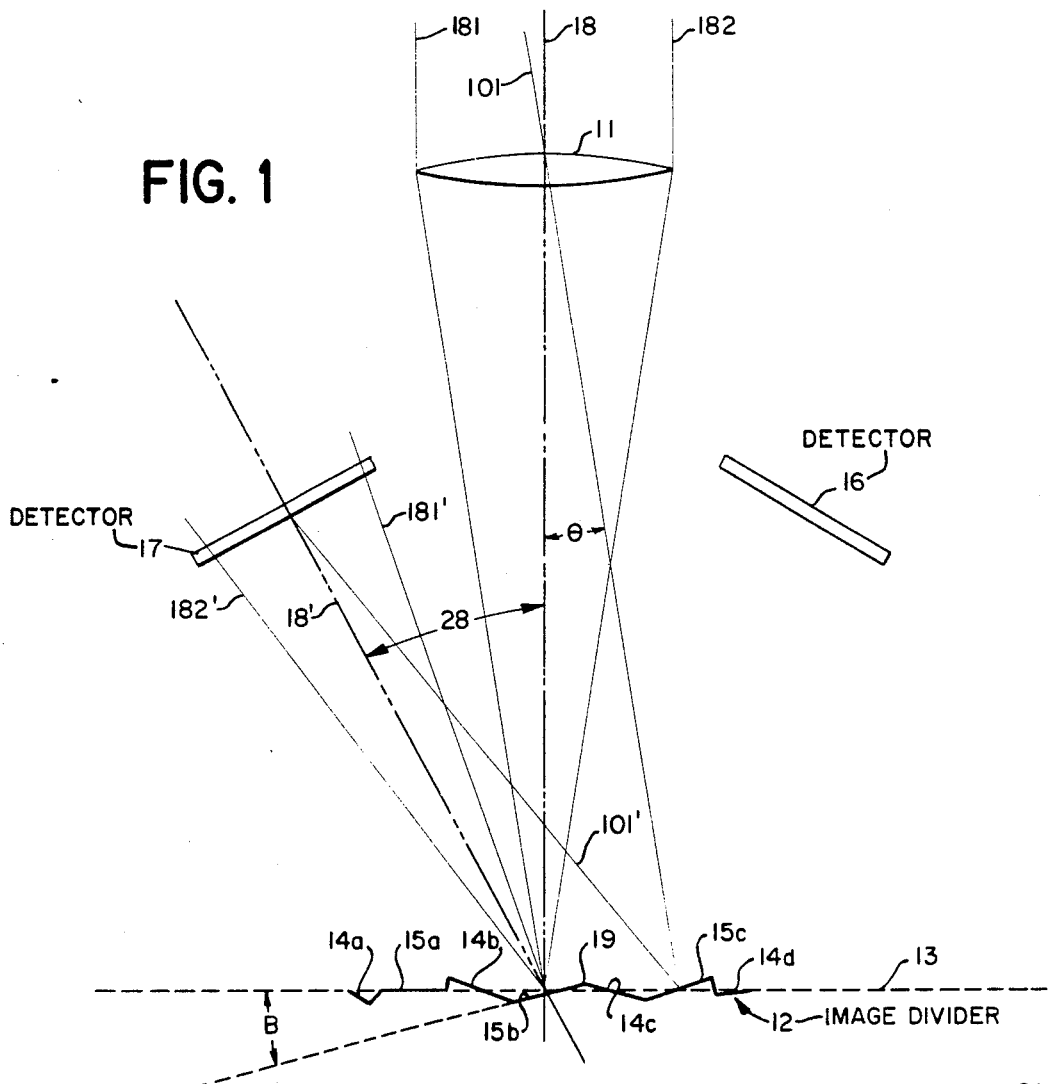
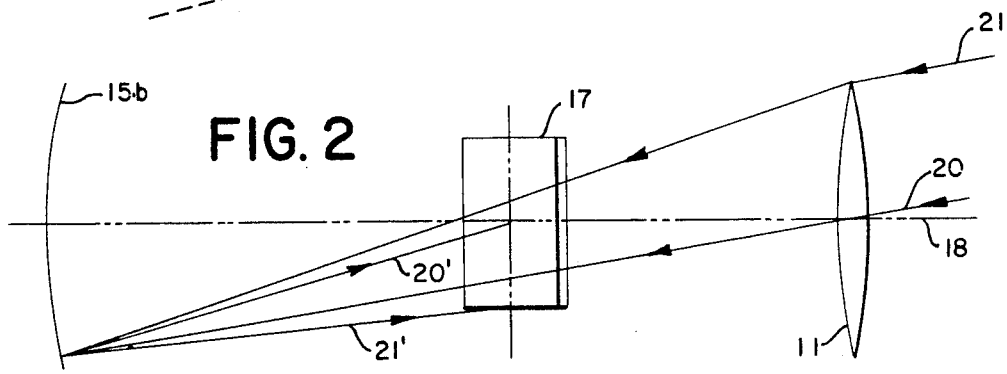
INVENTOR
RICHARD H. ENGELMANN
BY Darby & Darby
ATTORNEYS

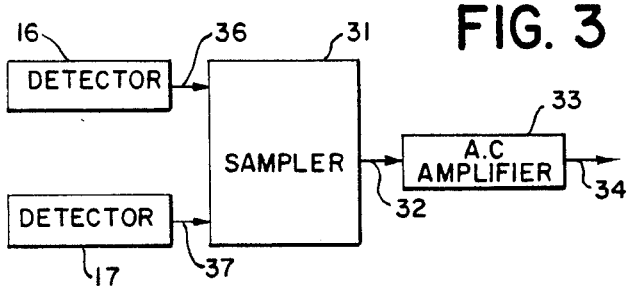
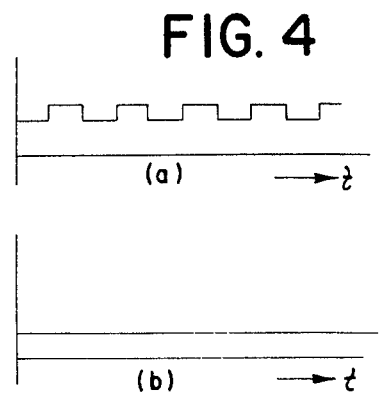
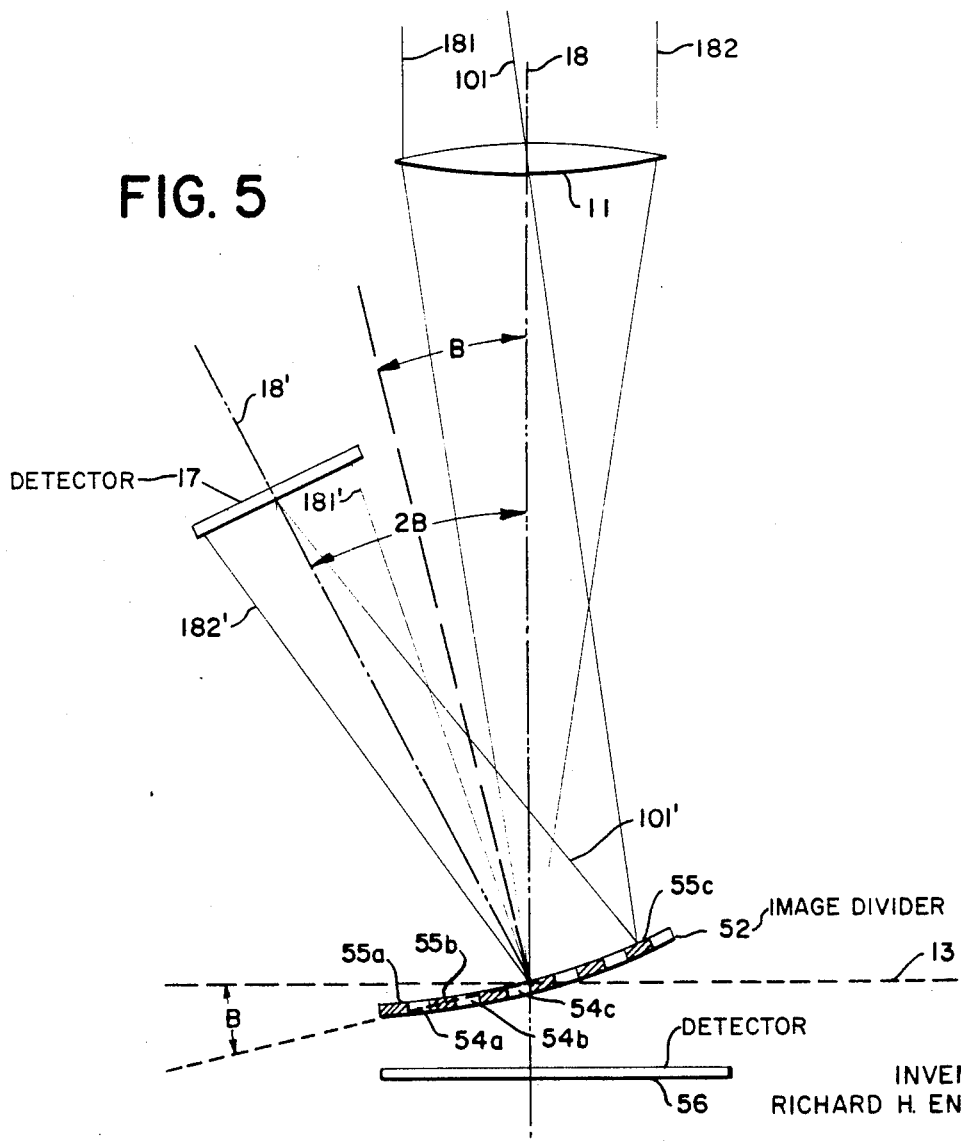
INVENTOR
RICHARD H. ENGELMANN
BY Darby & Darby
ATTORNEYS

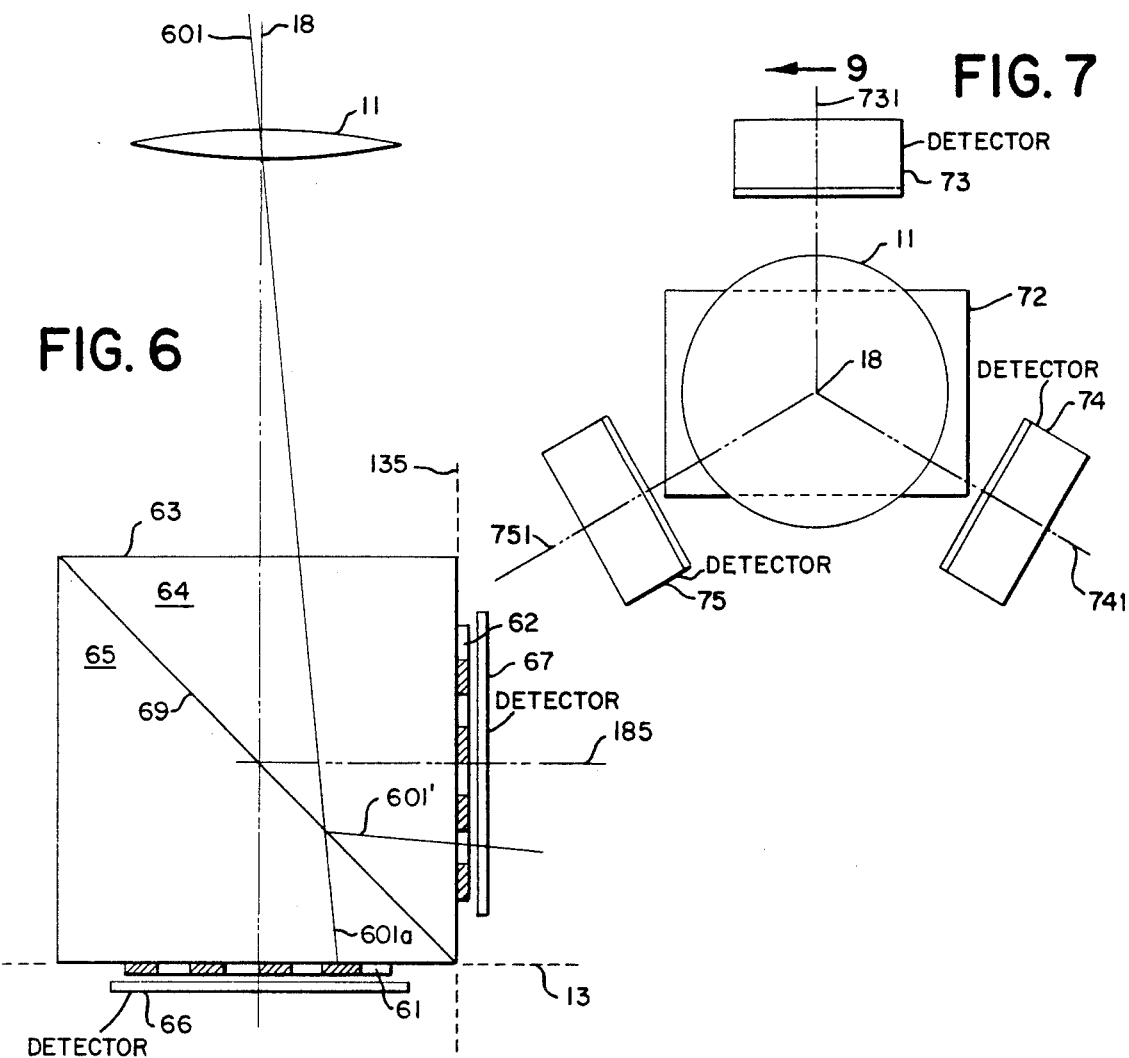
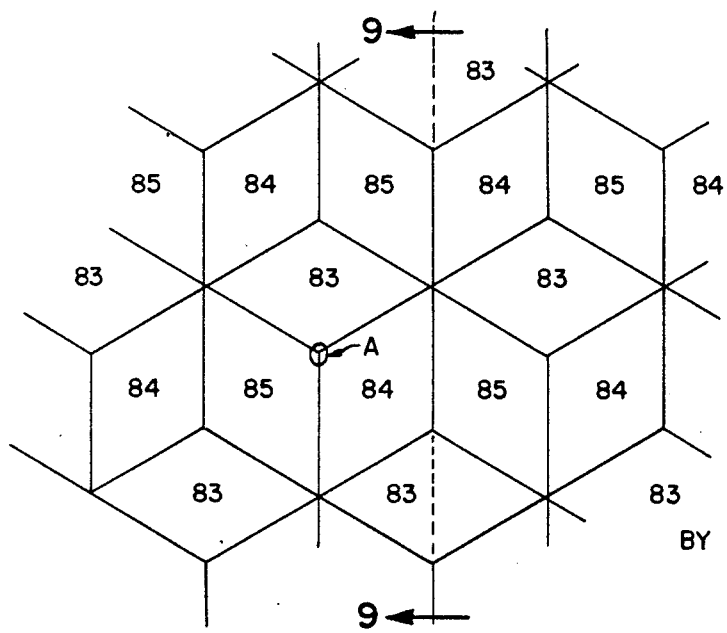
FIG. 6
FIG. 7
FIG. 8
INVENTOR
RICHARD H. ENGELMANN
BY Darby & Darby
ATTORNEYS

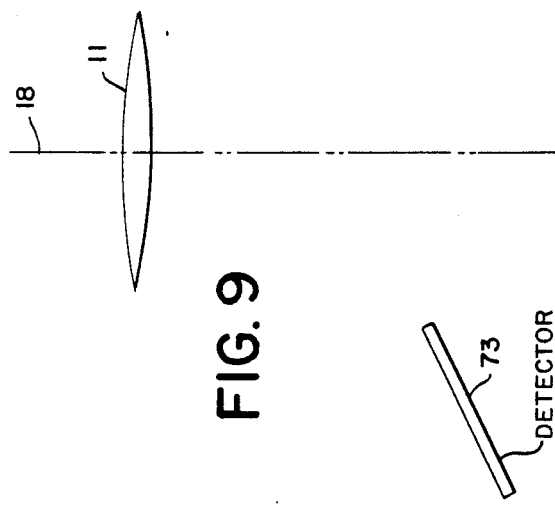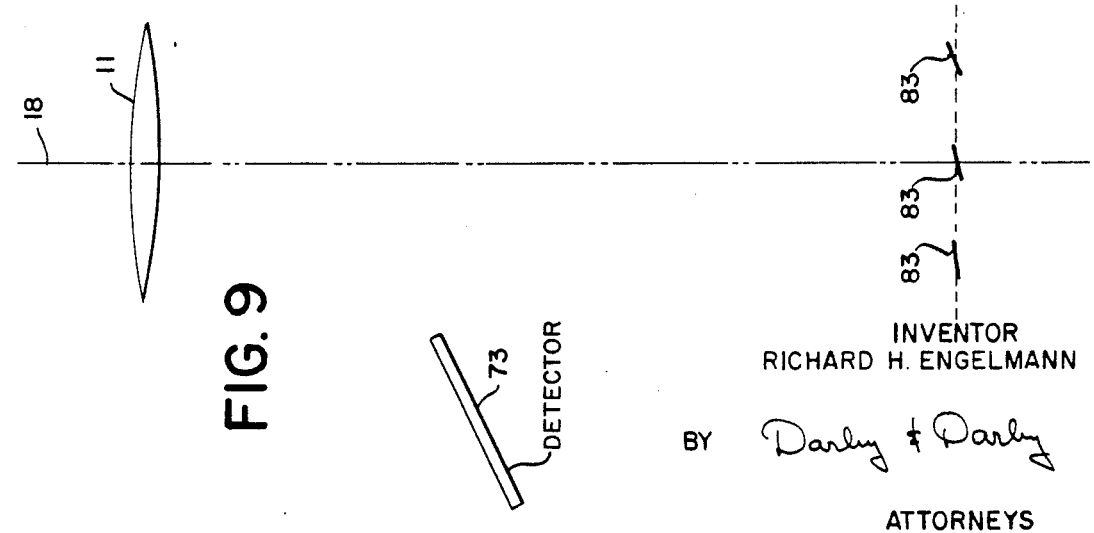
INVENTOR
RICHARD H. ENGELMANN
BY Darby & Darby
ATTORNEYS

United States Patent Office 3,518,443
Patented June 30, 1970

3,518,443
SYSTEM FOR DETECTING SMALL LIGHT SOURCES IN PRESENCE OF LARGE ONES USING PLURALITY OF DETECTORS
Richard H. Engelmann, Cincinnati, Ohio, assignor to J. Page Hayden, Cincinnati, Ohio
Filed Dec. 7, 1966, Ser. No. 599,752
Int. Cl. H01j 39/12
U.S. Cl. 250—220                                      15 Claims

ABSTRACT OF THE DISCLOSURE

This invention relates to systems for detecting small-area light sources in the presence of large-area light sources and for detecting small-area light sources embedded in a large area of background illumination. Briefly the invention includes a plurality of light detectors, means for dividing the optical field into a plurality of sets of elemental areas and for applying respective sets to each of said detectors, and means responsive to unequal outputs from said detectors for indicating the presence of a small light source in the optical field.

BACKGROUND OF THE INVENTION

For applications such as the automatic dimming of automobile headlights, it is desirable to have a light detection system capable of detecting small bright light sources imbedded in a large area of low-level background illumination. Conventional light detection systems are generally unsuitable for this purpose.

In conventional light detection sysetms, there is generally provided a light-sensitive device, such as, for example, a photocell, and an optical system for focussing the light from a predetermined optical field on the light-sensitive device. Hence, in addition to the light from small-area sources which may be present in the optical field, spurious background illumination and the light from large-area sources also impinges on the light-sensitive device. Because the level of the output of the light-sensitive element is simply proportional to the total amount of light from the optical field, it is impossible to determine from a particular output level whether or not a small-area light source is present in the optical field. In other words, conventional light detection systems are not able to discriminate between large-area light sources and small-area light sources.

Prior attempts to provide a light detection system capable of discriminating between large-area and small-area light sources have generally resulted in systems which rely on the motion of mechanical elements for their operation, such as, for example, the system disclosed in U.S. patent application Ser. No. 2,878,396 issued Mar. 17, 1959 to H. J. Behn et al. which employs a rotating drum discriminator.

SUMMARY OF THE INVENTION

It is an object of this invention to provide an improved system for detecting small-area light sources.

It is also an object of this invention to provide a small-light-source detection system having no moving parts.

In accordance with the above objects, this invention provides a small light source detection system comprising a plurality of light-sensitive devices and an optical system which serves to break up the field under view (including background illumination and the illumination from large-area sources) so that it impinges on two or more of the light-sensitive devices while the light from a small-area light source is caused to impinge on only one light-sensitive device so that all of the light-sensitive devices will have substantially the same output level except the device which receives light from the small-area source, which device will have a higher output level. Sampling means are provided for repetitively sequentially sampling the outputs of the light-sensitive devices. The output of the sampling means will remain nearly constant except for the peaks caused by the presence of small-area light sources in the optical field. Hence A.C. amplification of the output of the sampling means will produce pulses when a small light source is present.

An advantage of this small-area light-source detection system is that it is more compact and more reliable than systems using moving mechanical elements.

Although the present invention is particularly suitable for use in automatic dimming systems for automobile headlights, it will be appreciated by those skilled in the art that this invention is generally applicable to any problem which requires the detection of small-area sources in the presence of large-area sources and/or background illumination.

Other objects and advantages of the present invention will be apparent from the following detailed description and accompanying drawings which set forth the principles of the invention and, by way of example, the best modes contemplated for applying those principles.

BRIEF DESCRIPTION OF THE DRAWINGS

FIG. 1 shows a schematic plan view of a small-area light source detection system employing two light-sensitive detector devices in accordance with the principles of the invention.

FIG. 2 shows a schematic elevation view of the small-area light source detection system shown in FIG. 1 viewed in a plane perpendicular to the plane of FIG. 1.

FIG. 3 shows a block diagram of the electronic circuitry of the system shown in FIG. 1.

FIG. 4 shows the waveforms of typical outputs of the sampler shown in FIG. 3.

FIG. 5 shows a schematic plan view of another small-area light source detection system using a modified reflective surface in accordance with the principles of the invention.

FIG. 6 shows a diagrammatic plan view of a third small-area light source detection system using a beam splitter in accordance with the principles of the invention.

FIG. 7 shows a front view of an arrangement of three light-sensitive devices suitable for use in a system of the type shown in FIG. 1.

FIG. 8 shows an elevation view of a reflective surface suitable for use with a system having three light-sensitive devices.

FIG. 9 shows a cross-sectional view taken along the line 9—9 of FIG. 8.

FIG. 10 shows a block diagram of the electronic circuitry of a system having three light sensitive devices.

FIG. 11 shows waveforms of typical outputs of the sampler and A.C. amplifier shown in FIG. 9.

DESCRIPTION OF THE PREFERRED EMBODIMENTS

Referring now to the preferred embodiment shown in FIG. 1, light from the optical field passes through lens 11, which has a focal plane 13 at which is located reflecting surface 12, comprising a plurality of reflecting strips diagrammatically in two sets, 14a, 14b, 14c, and 14d, and 15a, 15b, and 15c. The first set 14a–d is so placed as to cause incident light from lens 11 to be reflected to light-sensitive device or detector 16 which may be, for example, a photo multiplier tube or a solid state photo conductive element or any other of the many types of light-sensitive devices known to those skilled in the art. The second set 15a–c is so placed as to reflect incident light from lens 11 to a similar light-sensitive device or detector 17. It will be understood that the width of the strips shown in FIG. 1 is greatly exaggerated, the actual strips to be used being much narrower for reasons set forth below. Further, the angles subtended at lens 11 by each of these strips should be equal.

Light incident on detectors 16 and 17 of FIG. 1 will produce output signals on lines 36 and 37, respectively, of the circuit shown in FIG. 3. The outputs of detectors 16 and 17 are repeatedly sampled by sampler 31 which may comprise, for example, a pair of analog gates controlled by a free-running multivibrator or any other suitable circuit means for alternately switching the signals from inputs 36 and 37 to output 30. Output 32 of sampler 31 feeds A.C. amplifier 33, having output 34. If the outputs of detectors 16 and 17 are not equal, the signal on line 32 will be in the form of a square wave superimposed on a D.C. signal as shown in FIG. 4(a), while equal outputs of the detectors will produce a D.C. signal on line 32 as shown in FIG. 4(b).

The A.C. amplifier 33 will remove the D.C. components and will amplify the A.C. components of the signal fed to it from line 32, giving at its output 34 a waveshape similar to that of its input, but having no direct current component. Thus, the presence of an A.C. signal on line 34 indicates an imbalance between the signals on lines 36 and 37, and further the magnitude of the signal on line 34 is a direct measure of the degree of imbalance independent of the magnitude of the direct current components of the signals on lines 36 and 37. It will be appreciated that although an A.C. amplifier is used in the preferred embodiment shown in FIG. 3, the principles of the invention embrace other means for detecting an imbalance between the outputs of the light-sensitive detectors. For example, the outputs of the detectors might be subtracted from each other, a sufficiently large non-zero result of either polarity being indicative of the presence of a small light source in the optical field.

Since, in the preferred embodiment of FIG. 1, the reflecting surface 12 is located at focal plane 13 of lens 11, an image of the optical field "seen" by reflecting surface 12 through lens 11 will be formed at focal plane 13. And since the deviation of the segments of reflecting surface 12 away from focal plane 13 is small, the image will be substantially in focus at any point on reflecting surface 12. But, it must be understood that the principles of the invention embrace embodiments wherein the reflecting surface or its equivalent is not located at the focal plane of the image forming means. For example, in order to reduce the size of the light-sensitive detectors it might be desirable to have the image in focus at the detectors. Such an arrangement would require the use of slightly wider reflecting strips in order to accommodate the out-of-focus images of the small light sources at the reflecting surface.

If the optical field is of uniform brightness, reflecting surface 12 will direct equal amounts of light to each of detectors 16 and 17; strips 15a, 15b, and 15c directing light to detector 17, while strips 14a, 14b, 14c, and 14d direct light to detector 16. It will be noted that in the embodiment shown in FIG. 1 strips 14a and 14d are half the width of other strips, and together are equal to one. This arrangement is not necessary if many narrow strips are used, as will be explained below. The output of detectors 16 and 17 will then be substantially equal (allowing for minor differences in the detectors), and the output of sampler 31 of FIG. 3 will appear substantially as shown in FIG. 4b). Hence no signal will appear at the output of A.C. amplifier 33 shown in FIG. 3.

If the brightness of the optical field is nonuniform, different amounts of light may be delivered to detectors 16 and 17, and the output of sampler 31 may no longer be constant. But the amounts of light delivered to the two detectors will be approximately balanced under all conditions except when a small-area source of light is present in the optical field provided the following conditions are met:

First, the total solid angles subtended by each set of strips, as measured from the center of the lens, should be equal. This is necessary even for the case of uniform brightness.

Second, the solid angle subtended by each strip as measured from the lens, should be substantially the same as the solid angle subtended by adjacent strips, so that the amounts of non-uniform background illumination and light from large sources which fall on adjacent strips will be approximately equal and hence produce approximately equal contributions to the outputs of detectors 16 and 17.

Third, the strips should be as narrow as is commensurate with the apparent size of the small-area sources to be detected in the optical field and with the resolving power of the lens. Reducing the width of the strips and consequently increasing their number will enhance the equality of division of the incident light from large sources between the two light detectors 16 and 17.

If a small source is present in the field, its image will impinge on one reflective strip only. Hence the total amount of light directed to one of the two detectors 16 and 17 will be greater than the amount directed to the other, and consequently, the output of sampler 31 in FIG. 3 will appear as shown in FIG. 4(a). A.C. amplifier 33 amplifies the alternating component. The signal strength of the output from A.C. amplifier 33 will be proportional to the strength of the small source only.

There is, however, the possibility that the image of the small source will fall exactly on the boundary between adjacent reflecting strips, as at point 19 in FIG. 1. In this case equal amounts of light would be directed to the two detectors 16 and 17, resulting in a null signal at the output 34 of amplifier 33. But in most applications of the present small-area light detection system, either the detector or the source, or both, is likely to be in motion so that the above described condition would be momentary only, although it would probably repeat. In many applications such as, for example, automatic dimming arrangements for vehicular headlighting, momentary loss of signal is of little consequence, because time delay circuits may be incorporated into the circuitry in order to prevent immediate return to high beam on loss of signal.

The likelihood of loss of signal may be reduced by increasing the width of the strips of reflective surface 12 shown in FIG. 1 at the expense of being less able to distinguish between small sources and large sources. On the other hand, the modification of the invention shown in FIG. 7 renders the possibility of loss of signal more remote without reducing the ability of the detector system to discriminate between small sources and large sources as will be explained in detail hereinafter.

Referring again to reflective surface 12 shown in FIG. 1, it will be noted that the reflective strips of one set for example, 15a, 15b, 15c, are disposed at different angles to focal plane 13, than are the strips of other set 14a, 14b, 14c and 14d. The reason for this arrangement will become apparent by considering rays from various points in the optical field. For example, assume a ray from a light source on the optical axis 18. It will be focussed on focal plane 13, at the center of strip 15b together with rays 181 and 182 from the same source. Strip 15b is disposed at angle B relative to focal plane 13, so that the reflected ray from optical axis 18 will be directed along axis 18', at an angle of 2B to axis 18. Similarly, rays 181 and 182 will be reflected as rays 181' and 182' shown in FIG. 1.

On the other hand, ray 101 passes through the center of lens 11 from a source not on optical axis 18. All rays from this source will be focussed in the center of strip 15c. In order to permit the use of relatively small economical detectors, it is desirable that all of the reflected rays strike at or near the center of the detectors. To a first degree of approximation, the angle between rays 101 and 101' will be 2B just as in the case of rays 18 and 18'. But ray 101 enters the optical system at an angle $\theta$ to the optical axis. Therefore, it is necessary to dispose strip 15c at angle $\theta+B$ to optical axis 18 so that reflected ray 101' impinges on the center of detector 17. It is assumed that rays from the same source as ray 101 coming through the edges of lens 11 will reach detector 17 at about the same points as 181' and 182'.

Accurate calculation of exact angles depends on several factors, including the size of lens 11, the focal length of lens 11, the size of reflective surface 12, the size of detectors 16 and 17, and the distance from reflective surface 12 to detectors 16 and 17. These calculations are well known to those skilled in the optical art, and need not be set forth in detail here. It is pointed out, however, that for many simple lenses the focal plane 13 approximates a spherical surface concave toward the lens. This further complicates the calculations, but results in a reflective surface requiring less pronounced discontinuities between the reflective strips than are shown between strips 14a and 15a, strips 15a and 14b, etc. in FIG. 1.

FIG. 2 is an elevation view taken perpendicular to the plane of FIG. 1 passing through optical axis 18 and strip 15b of reflecting surface 12. In FIG. 2 it is noted that the surface of the strip 15b is in the form of an arc of a circle, the center of which is on optical axis 18. This shape is adopted in order to permit the use of small economical detectors. Rays from a source on the optical axis 18 will all strike detector 17, as described above in connection with FIG. 1. It is also desirable that rays 20 and 21 from a source not on optical axis 18 strike near the center of detector 17. For example, reflected ray 20' of ray 20 strikes the center of detector 17, while reflected ray 21' of ray 21 strikes the lower edge of detector 17. Although not shown, a ray entering the lower edge of lens 11 from the same source as rays 20 and 21 would, on reflection, strike the upper edge of detector 17. If all angles are sufficiently small that the sine of the angle is approximately equal to the angle in radians, the radius R of the circle of which strip 15b is a part is given to a good degree of accuracy by $$R = \frac{2d}{1+\frac{d}{x}}$$

where $d$ is the focal length of lens 11 and $x$ is the distance from the center of strip 15b to the center of detector 17. Calculations of this type may be carried out for each strip in reflective surface 12.

FIG. 5 shows an alternate embodiment of the present invention which provides a simpler reflecting structure at the expense of a larger light-sensitive detector. Reflective surface 12 of FIG. 1 has been replaced by a cylindrical or spherical structure 52, which may be made, for example, of glass. Structure 52 comprises alternate strips of reflecting material 55a, 55b, 55c, and strips of transparent material 54a, 54b, 54c, etc. Rays reflected from the reflecting strips 55a, 55b, 55c are directed to detector 17 as described in connection with FIG. 1. For example rays 181 and 182 intercept one of the reflective strips and reach detector 17 as rays 181' and 182'. The curvature of structure 52, according to the equation given above in the discussion of FIG. 2, will permit off-axis rays such as 101, 101' which intercept a reflective strip to also reach detector 17. As explained above in connection with FIG. 1, structure 52 may be planar in form, at the expense of requiring a somewhat large detector 17.

Detector 16 of FIG. 1 is replaced by detector 56 in FIG. 5. Detector 56 is placed behind focal plane 13 and structure 52 and is of necessity somewhat larger than detector 16 of FIG. 1. Rays reaching a transparent strip of structure 52 will pass through to detector 56. It will be appreciated by those skilled in the art that structure 52 cannot coincide entirely with the focal plane and that the resultant defocussing at the edges will make it more difficult to detect small sources at the edge of the field. It will also be evident that the pattern of reflective and transparent areas of structure 52 need not be strips, but may be any other repeating figure such as, for example, a checkerboard or a series of triangles having their bases alternately reversed. Such patterns are, however, subject to the increased possibility of a small source appearing on the dividing line between reflective and transparent areas.

Still another alternative embodiment of the present invention is shown in FIG. 6, in which beam splitter 63 comprises two prisms 64 and 65, having a partially reflecting common surface 69. A ray of light travelling along optical axis 18 will be partially reflected at surface 69, some of the light passing through surface 69 and continuing along axis 18, the remainder being reflected along axis 185. Other rays, such as 601, will be similarly split, one part passing through surface 69 as ray 601a, and the other part being reflected as ray 601'. The two faces of the beam splitter from which rays emerge are placed at the focal plane 13 and the reflected focal plane 135. At these faces are located two grids 61 and 62 comprising alternately opaque and transparent regions of equal area, and which may be in the form of strips, squares, or triangles as described above in connection with structure 52 of FIG. 5.

Grids 61 and 62 are constructed and located so that if both grids were to be projected onto surface 69 the opaque areas of one grid would be in register with the transparent areas of the other. By reason of this arrangement, any given incident ray, such as for example ray 601, will be blocked by one grid 61 in this case and passed by the other grid 62 in this case. Hence the optical field is effectively divided into two parts, one part directed to detector 66 through the transparent areas of grid 61, and the other part directed to detector 67 through the transparent areas of grid 62.

The alternative embodiment shown in FIG. 6 has the advantage of simplicity of construction, but has the practical disadvantage that for the ordinarily available half-reflective surfaces the amount of light passed through surface 69 will not be precisely equal to the amount of light reflected by surface 69. It is therefore necessary to use a neutral density filter in the optical path of one detector in order to match the channels.

As mentioned above in connection with FIG. 1, there is a small probability that the image of a small source will fall precisely on the boundary between two reflecting strips of reflecting surface 12, thus providing equal contributions of light to the two detectors 16 and 17, thereby causing a loss of signal at the output 34 of A.C. amplifier 33. The probability of such a loss of signal may be substantially reduced by means of the arrangement of the modified small-area light source detection system of FIG. 7 which shows lens 11, modified reflective surface 72, and detectors 73, 74, and 75, symmetrically arranged around optical axis 18 on radii 731, 741, and 751, respectively.

FIG. 8 shows modified reflective surface 72 of FIG. 7 in greater detail. In FIG. 8 all faces of the reflective surface labelled 83 are oriented so as to reflect toward detector 73, all faces labelled 84 are oriented to reflect toward detector 74, and all faces labelled 85 reflect toward detector 75.

FIG. 9 is a cross-sectional view of FIG. 7 taken along the line 9—9 and showing lens 11 and detector 73. Reflecting segments 83 and focal plane 13 of FIG. 9 correspond to reflecting areas 83 on line 9—9 of FIG. 8.

It is noted that, according to the modified form of this invention shown in FIGS. 7, 8 and 9, only one-third of the total illumination will reach any one of the detectors 731, 741, and 751, thus reducing the possibility of saturation of any one detector. It is also noted that the probability of the image of a small source appearing on the dividing line between two faces is somewhat increased by the configuration shown in detail in FIG. 8, but the probability that the image will appear equally on three adjacent faces, such as at point A in FIG. 8, is quite remote. In fact, as a general matter a small source will traverse the entire optical field without appearing simultaneously on three adjacent faces.

Referring now to FIG. 10, which is a block diagram of the electronic circuitry associated with the arrangement of FIG. 7, sampler 76 sequentially and repetitively samples the outputs of detectors 73, 74 and 75. The output of sampler 76 is passed via line 77 to clamping circuit 771, integrator 772, peak detector 773 and the output line 79. If no small-area source is present in the optical field, the output of sampler 76 will be in the form of an unvarying voltage as shown in FIG. 11(a). A similar output would result if the image of the small source falls equally on three faces of reflective structure 72 as for example at point A in FIG. 8. On the other hand, if the image of the small source falls on only one face of reflective structure 72, the output of sampler 76 will resemble the waveform of FIG. 11(b) which exhibits an increased amplitude for one-third of each cycle. When the image of the small light source falls on the boundary between two faces of reflective structure 72, the output of sampler 76 will resemble the waveform of FIG. 11(C) which exhibits half the increase in amplitude of the waveform of FIG. 11(b) for two-thirds of the cycle. Hence a usable A.C. signal remains during such times as the image of the small light source falls on the boundary between two faces of reflective structure 72.

The output from an A.C. amplifier such as amplifier 33 in FIG. 3, may be applied directly to a utilization device such as, for example an automatic automobile headlight dimming system, or, as shown in FIG. 10, additional circuitry can be employed to further process the signal prior to utilization. For example, a clamping circuit 771 may be inserted at the output 77 of sampler 76 so as to clamp the signal to its lowest level leaving the pulses due to the presence of a small light source in the optical field. Clamping circuit 771 may be of the conventional type well known to those skilled in the art. The clamping of the waveform shown in FIG. 11(b) yields the waveform shown in FIG. 11(d). Similarly, the clamping of the waveform shown in FIG. 11(C) yields the waveform shown in FIG. 11(e).

The clamped signals are then integrated by integrator 772 so as to produce voltage peaks in response to the pulses due to the presence of a small light source in the optical field. Integrator 772 may comprise, for example, an operational amplifier having a feedback capacitor and means for discharging the capacitor at the end of each sampling cycle, or any other suitable integrator circuit known to those skilled in the art. Integration of the waveform of FIG. 11(d) produces the waveform of FIG. 11(f) and integration of the waveform of FIG. 11(c) produces the waveform of FIG. 11(g). It is noted that the peaks of the integrated waveforms are of the same amplitude. This is because, although the pulses of the waveform of FIG. 11(e) are only half as high as the pulses of the waveform of FIG. 11(d), they are twice as long.

The output of the integrator 772 is detected by peak detector 773. Since the size of the voltage peaks from integrator 772 are the same whether the image of the small light source falls on only one face or on two faces of reflective structure 72, peak detector 773 will accurately indicate the presence of a small light source under both conditions.

Although the principles of this invention have been illustrated by reference to a preferred embodiment and several modified or alternative embodiments, it will be understood that certain changes in form and details may be made without departing from the spirit and scope of the invention as set forth in the appended claims.

I claim:
1. Apparatus for detecting the presence of a small light source in an optical field independently of the ambient light level of the optical field, comprising:
   a plurality of light-sensitive detector means, the outputs from said detector means being responsive to the amount of light applied to said detector means;
   image forming means for forming an image of said optical field at an image plane;
   image dividing means at said image plane for dividing said image of said optical field into a plurality of image areas and for applying the light from at least one of said image areas to each of said detector means, the size of each of said image area being substantially equal to the size of the image of the largest small light source to be detected; and
   indicating means responsive to said outputs from said detector means for indicating the presence of a small light source in said optical field when the levels of said outputs are unequal.
2. Apparatus of the type described in claim 1 wherein the light from a plurality of image areas is applied to each of said detector means.
3. Apparatus of the type described in claim 2 wherein the aggregate area of the plurality of image areas associated with each detector means is substantially equal to the aggregate area of the plurality of image areas associated with any other detector means.
4. Apparatus of the type described in claim 2 wherein adjacent image areas are associated with different detector means.
5. Apparatus of the type described in claim 4 wherein said indicating means comprises:
   sampling means for sequentially sampling the outputs from said detector means; and
   an A.C. amplifier responsive to the output from said sampling means, whereby an A.C. output signal from said A.C. amplifier indicates the presence of a small light source in said optical field
6. Apparatus of the type described in claim 4 wherein said image dividing means comprises a reflective structure at said image plane, said reflective structure comprising a plurality of parallel reflective strips, adjacent strips being disposed at different angles to said image plane so as to reflect adjacent image areas to different detector means.
7. Apparatus of the type described in claim 6 wherein the width of each reflective strip is substantially equal to the width of the image of a small light source to be detected.
8. Apparatus of the type described in claim 7 wherein said plurality of light sensitive detector means consists of two light sensitive detector means.
9. Apparatus of the type described in claim 4 wherein said image dividing means comprises a reflective structure at said image plane, said reflective structure comprising a plurality of reflective areas, adjacent reflective areas being disposed at different angles to said image plane so as to reflect adjacent image areas to different detector means.
10. Apparatus of the type described in claim 9 wherein said indicating means comprises:
    scanning means for scanning the outputs from said detector means;
    clamp means for clamping the output of said scanning means to its lowest level;
    integrator means for integrating the output of said clamp means; and
    a peak detector responsive to output peaks from said clamp means, the output from said peak detector indicating the presence of a small light source in said optical field.
11. Apparatus of the type described in claim 9 wherein said plurality of light-sensitive detector means consists of three-sensitive detector means.
12. Apparatus of the type described in claim 4 where- in said image dividing means comprises a member at said image plane having alternate reflective areas and transparent areas, said reflective areas reflecting light to a first detector means and said transparent areas transmitting light to a second detector means.

13. Apparatus of the type described in claim 4 wherein said image dividing means comprises:
   a half-reflecting surface disposed at an angle to said image plane;
   a first member having alternate opaque and transparent areas, said transparent areas transmitting light transmitted by said half-reflecting surface to a first detector means; and
   a second member having alternate opaque and transparent areas, said transparent areas transmitting light reflected by said half-reflecting surface at second detector means, said transparent areas of said second member being effectively in registration with said opaque areas of said first member, and said opaque areas of said second member being effectively in registration with said transparent areas of said first member.

14. Apparatus of the type described in claim 13 further including a neutral density filter interposed in the optical path of one of said detector means.

15. Apparatus for detecting the presence of a small light source in optical field independently of the ambient light in said optical field, comprising a plurality of light-sensitive detector means,
means for dividing said optical field into a plurality of sets of elemental areas and for applying the light from a respective set of elemental areas to each of said detector means, the size of each of said elemental areas being substantially equal to the size of the largest small light source to be detected, adjacent elemental areas being associated with different detector means and said sets of elemental areas having substantially equal aggregate areas; and
indicating means responsive to unequal output levels from said detector means for indicating the presence of a small light source in said optical field.

References Cited

UNITED STATES PATENTS

| | | | |
|---|---|---|---|
| 2,142,378 | 1/1939 | Sachtleben | 250—220 |
| 2,412,822 | 12/1946 | Malter | 250—220 X |
| 2,813,983 | 11/1957 | Hammar | 250—220 |
| 3,329,818 | 7/1967 | Woehl | 250—203 |
| 3,351,763 | 11/1967 | Shuart | 250—220 X |

RALPH G. NILSON, Primary Examiner

M. ABRAMSON, Assistant Examiner

U.S. Cl. X.R.

250—203